United States Patent
Liao

(10) Patent No.: US 6,637,933 B1
(45) Date of Patent: Oct. 28, 2003

(54) APPARATUS FOR MEASURING OUTDOOR TEMPERATURE AND HUMIDITY

(76) Inventor: Yi-Chia Liao, No. 47, Alley 93, Niu-Pu S. Rd., Hsinchu (TW)

(*) Notice: Subject to any disclaimer, the term of this patent is extended or adjusted under 35 U.S.C. 154(b) by 0 days.

(21) Appl. No.: 10/085,766

(22) Filed: Mar. 1, 2002

(51) Int. Cl.[7] .................. G01K 1/06; G01K 1/08; G01K 1/12; G01K 13/00; G01K 21/06

(52) U.S. Cl. .............. 374/142; 374/170; 374/109; 374/208; 116/206; 116/200

(58) Field of Search .................. 374/109, 142, 374/208, 194, 170, 163; 73/73; 116/206, 200

(56) References Cited

U.S. PATENT DOCUMENTS

| | | | | |
|---|---|---|---|---|
| 3,709,039 A | * | 1/1973 | Preiser et al. | 73/336 |
| 4,503,707 A | * | 3/1985 | Rosa et al. | 73/336.5 |
| 4,973,170 A | * | 11/1990 | Bescherer et al. | 374/208 |
| 5,105,366 A | * | 4/1992 | Beckey | 364/505 |
| 5,889,466 A | * | 3/1999 | Ferguson | 340/602 |
| 5,978,738 A | * | 11/1999 | Brown | 702/3 |
| 2001/0017053 A1 | * | 8/2001 | Rynhart et al. | 73/73 |
| 2002/0135495 A1 | * | 9/2002 | Lei et al. | 340/870.11 |

FOREIGN PATENT DOCUMENTS

WO    WO99/41553    * 8/1999    ............ F24F/7/00

OTHER PUBLICATIONS

Polder Home Tools Magazine, pp. 6–7, 30–31. 2002.*

* cited by examiner

Primary Examiner—Diego Gutierrez
Assistant Examiner—G. Verbitsky
(74) Attorney, Agent, or Firm—Birch, Stewart, Kolasch & Birch, LLP

(57) ABSTRACT

An apparatus for measuring outdoor temperature and humidity includes a box type body which has a flat LCD screen located on one side, and a temperature sensor and a humidity sensor located on the surface thereof. The body includes a control circuit. The temperature sensor and humidity sensor, a temperature and humidity measuring circuit and LCD screen are integrated in one set. The body may be mounted on the exterior of a glass window by means of a fastening section located on the body without assistance of skilled professionals. Thus installation time and costs and wiring expenses may be saved. Outdoor temperature and humidity may be directly known indoors.

2 Claims, 5 Drawing Sheets

APPARATUS FOR MEASURING OUTDOOR TEMPERATURE AND HUMIDITY

FIELD OF THE INVENTION

The present invention relates to an apparatus for measuring outdoor temperature and humidity.

BACKGROUND OF THE INVENTION

The commonly used apparatus for measuring outdoor temperature and humidity usually include a main body hanging on an indoor wall or nearby a window, and have an electric wire extending from the main body to connect a temperature and humidity sensor located outdoors. The main body has temperature and humidity measuring circuits and display circuits to measure temperature and humidity values. To install the apparatus, a hole is drilled on the wall or a window for hanging the temperature and humidity sensor, or the window is opened for a slit for installing the sensor outdoors.

Another measuring apparatus include a main device and a secondary device. The main device has a display unit and a radio receiving circuit, and the secondary device has temperature and humidity measuring circuits, and a radio transmission circuit. When in use, the main device is installed indoors and the secondary device is installed outdoors. The temperature and humidity measuring circuits in the secondary device measure outdoor temperature and humidity values, and emits the measured values in radio fashion. The radio receiving circuit in the main device receives the transmitted temperature and humidity values and displays on the display unit.

The apparatus set forth above still have drawbacks, notably:

a. The first type of measuring apparatus requires to drill a hole on the wall, or to open a slit on the window. Moreover, the main body has to be hung on the wall or nearby the window. Installation is quite cumbersome and time-consuming. In addition, opening a slit on the window results in poor insulation, and rainwater tends to seep in and outdoor noises tend to invade into rooms. It also results in leakage of air conditioning and waste of energy.

b. The second type of measuring apparatus requires the secondary device to transmit temperature and humidity values by radio. It consumes a lot of electric energy, and requires to replace batteries frequently. Moreover, the radio transmission tends to cause radio frequency disturbances and has potential hazards to human body.

SUMMARY OF THE INVENTION

Therefore the primary object of the invention is to resolve aforesaid disadvantages. The invention couples temperature and humidity sensors and a measuring circuit in a box type body in an integrated forming fashion. The body may be freely placed outside a window to perform measuring function without skilled professionals to do installation or wiring. And outdoor temperature and humidity can be directly read indoors.

Another object of the invention is to provide an outdoor temperature and humidity measuring apparatus that has a cover plate located on a rear side of the body to prevent temperature and humidity measuring sensors from affecting by sun radiation heat to achieve accurate measurement of outdoor air temperature and humidity.

A further object of the invention is to provide an outdoor temperature and humidity measuring apparatus that is controlled by a microprocessor and has a display screen to provide indications with desired patterns.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
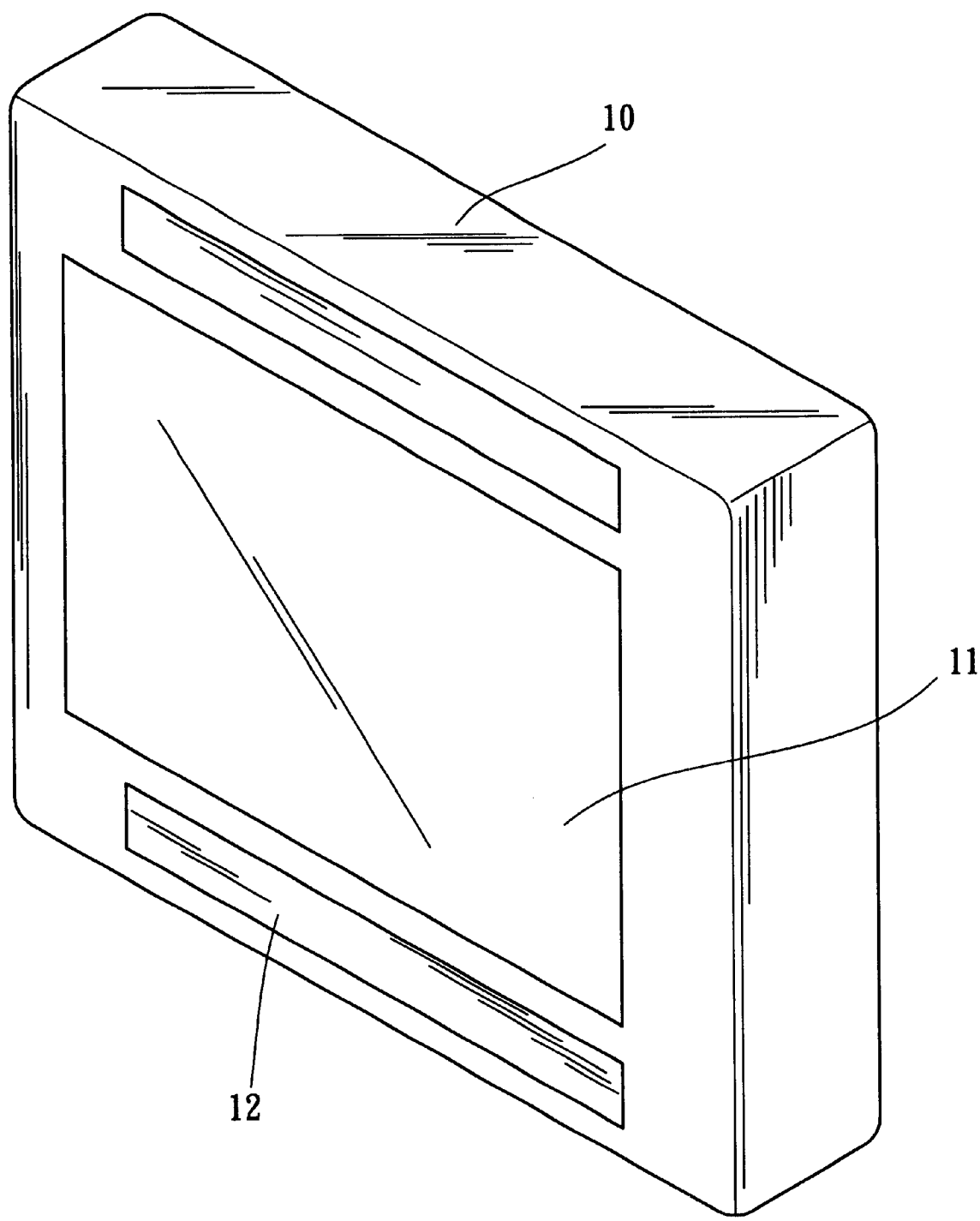
FIG. 1 is a perspective view of the invention.
Figure 2:
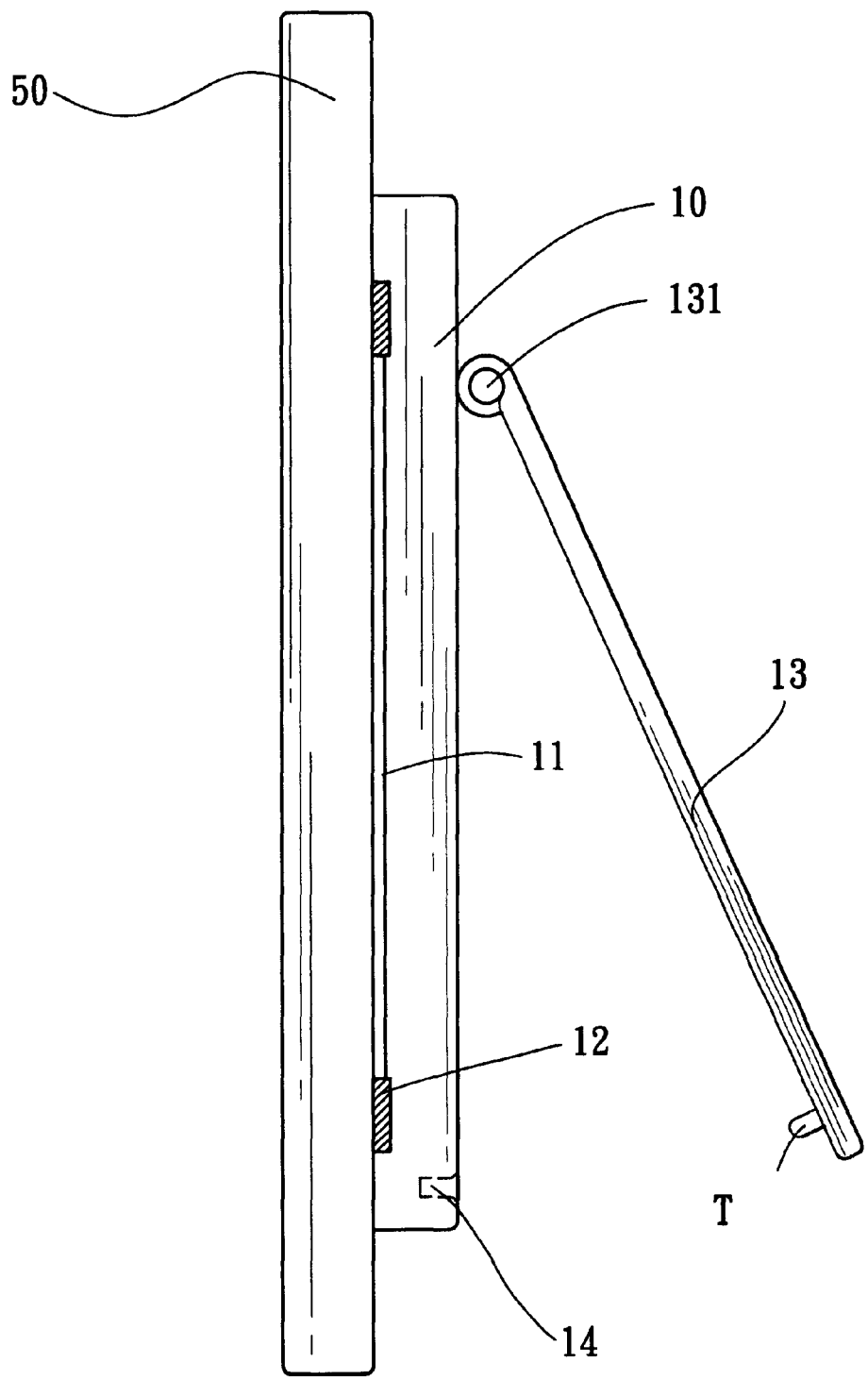
FIG. 2 is a schematic view of the invention in use.

Refer to FIG. 1 for an embodiment of the invention. The apparatus includes a box type body 10 which has a flat screen 11 on one side and a fastening section 12 (preferably a double-side adhesive tape) located at the periphery thereof. By means of the fastening section 12, the body 10 may be directly adhered to a glass window 50 from outdoors as shown in FIG. 2. Hence users may directly see the screen 11 indoors about outdoor temperature and humidity.

Figure 3:
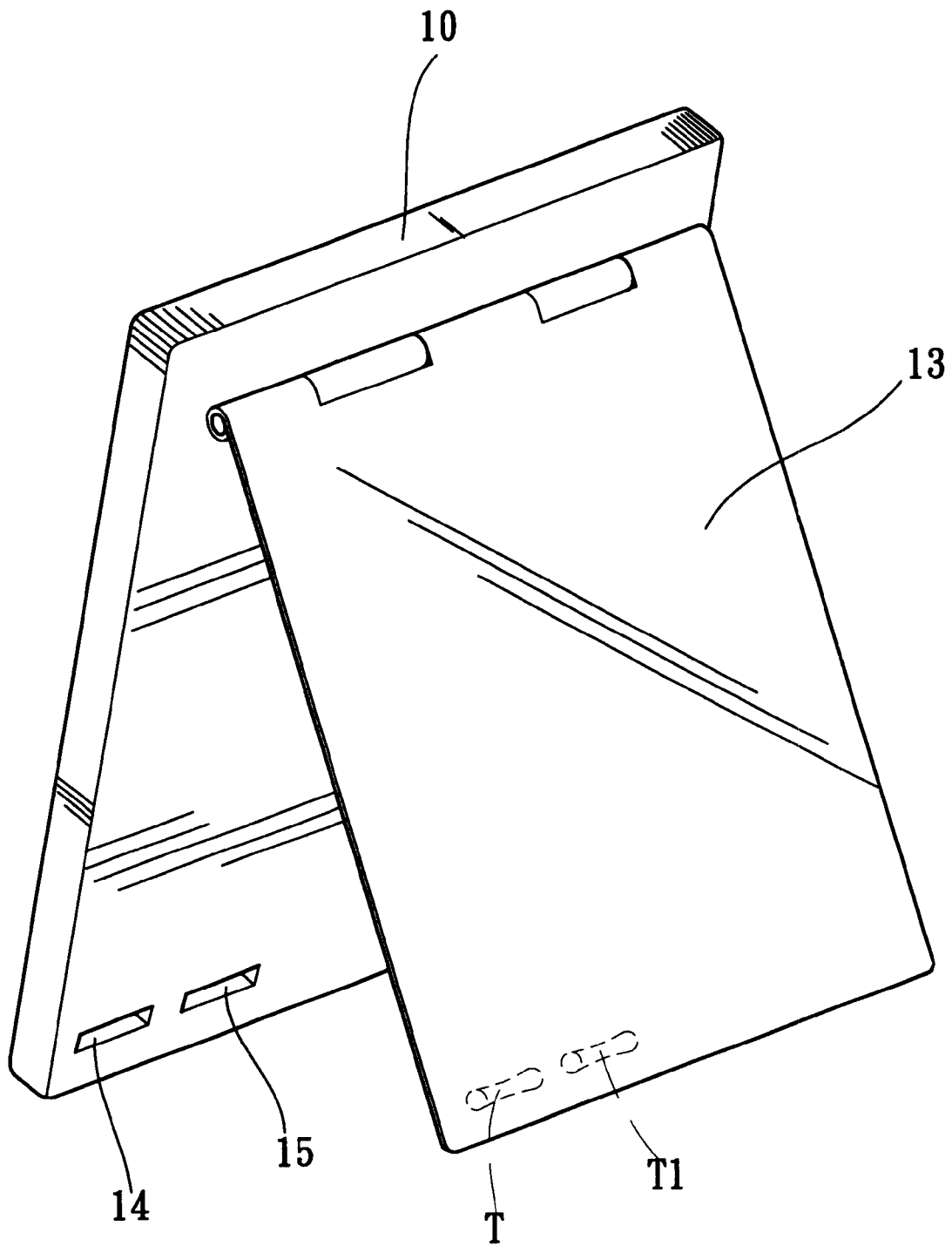
FIG. 3 is another perspective view of the invention.

Refer to FIG. 3 for another view of the embodiment. The rear side of the body 10 is engaged with a cover plate 13 through a hinge 131. The cover plate 13 may be opened or closed. At one end of the cover plate 13, there are a temperature measuring sensor T and a humidity measuring sensor T1. The body 10 has two apertures 14, 15 formed at locations corresponding to the temperature measuring sensor T and humidity measuring sensor T1 for housing the temperature measuring sensor T and humidity measuring sensor T1. Hence the cover plate 13 may be opened and lifted from the body 10 for a greater distance to prevent the temperature measuring sensor T and humidity measuring sensor T1 from affecting by indoor temperature, and to expose in outdoor environment for accurately measuring outdoor temperature and humidity. The cover plate 13 may further serve as a sunshade to prevent the temperature measuring sensor T and humidity measuring sensor T1 from being affected by sun radiation heat.

Figure 4:
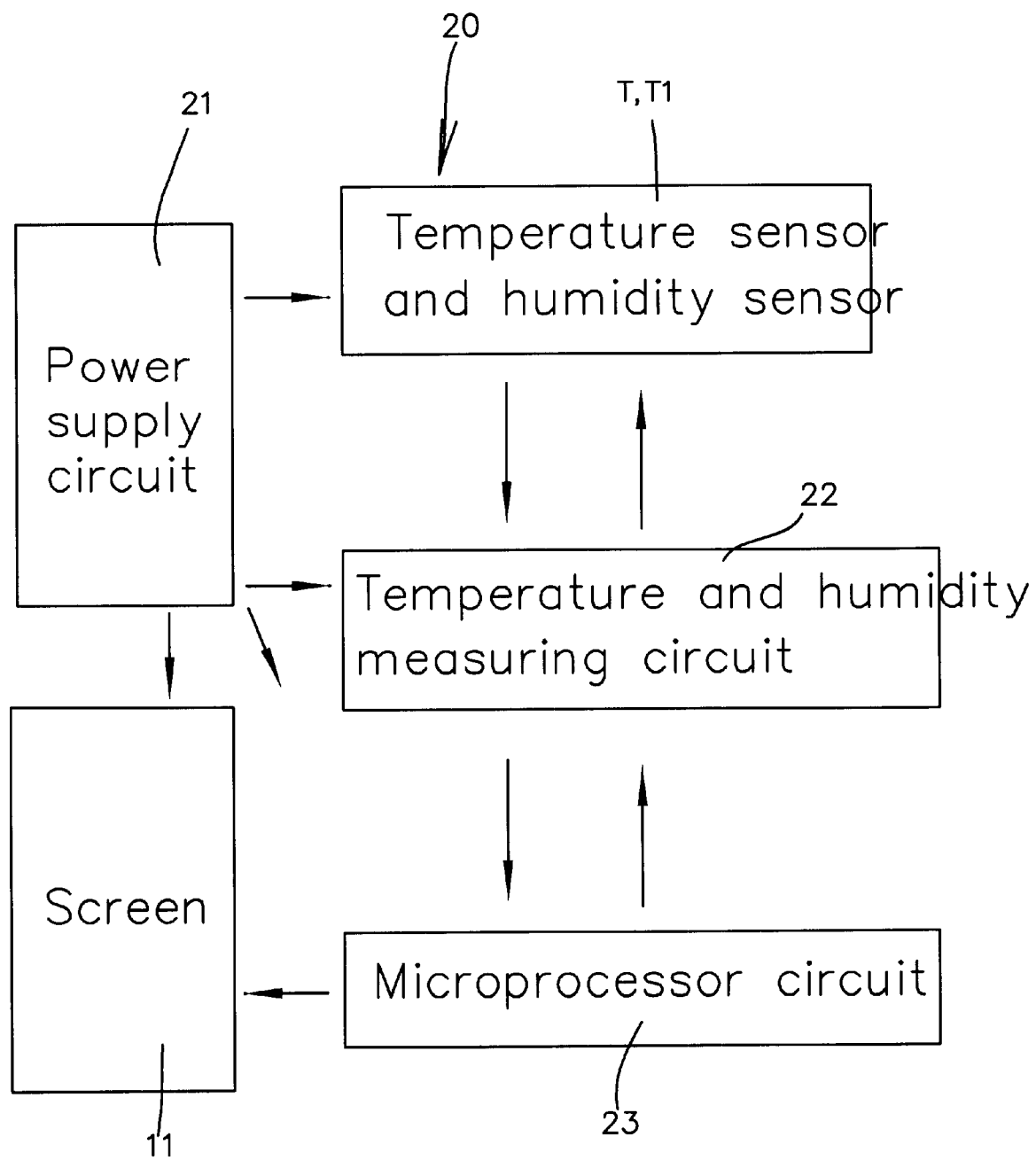
FIG. 4 is a control circuit block diagram of the invention.

Refer to FIG. 4 for a control circuit block diagram of the invention. In the body 10, there is a control circuit 20 which includes:

a power supply circuit 21 to provide power required by various elements of the control circuit 20;

a temperature and humidity measuring circuit 22 connecting the temperature sensor T and humidity sensor T1 located outdoors. The temperature sensor T and humidity sensor T1 have respectively a sensor element located at one end that has altering electric conductivity depending on changes of outdoor air temperature and humidity. The altering electric conductivity in turn changes a signal passing through to reflect outdoor temperature and humidity;

a microprocessor circuit 23: when activated, can trigger the temperature and humidity measuring circuit 22 to generate signals for transmitting to the temperature sensor T and humidity sensor T1. And the measured temperature and humidity values are displayed on the screen 11 and may be indicated by various patterns desired (such as sweater, overcoat, long sleeve shirt, short sleeve shirt, or the like). Thus users may get tips from the displayed patterns to know outdoor temperature and humidity, and to wear suitable clothing.

Figure 5:
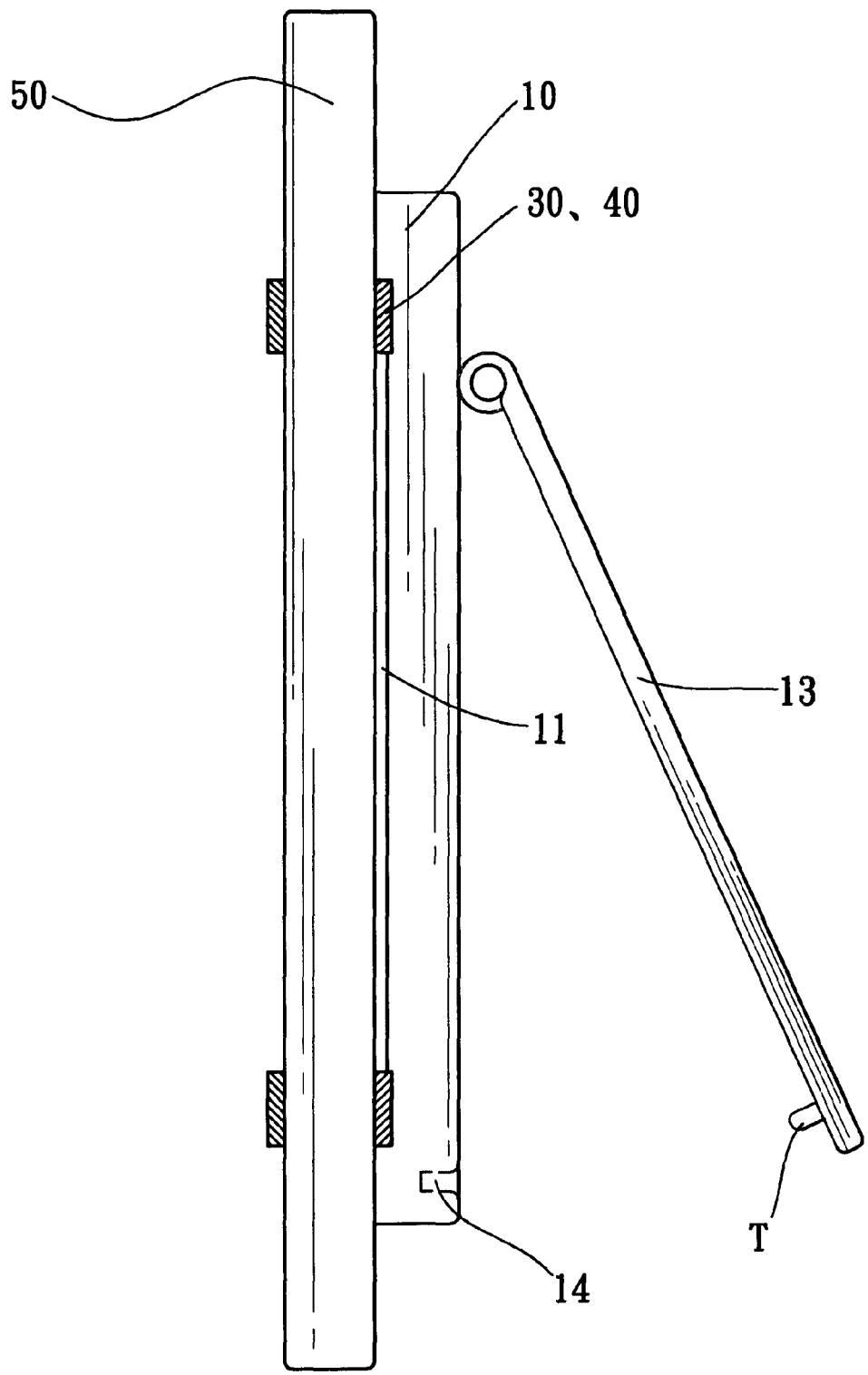
FIG. 5 is a schematic view of another embodiment of the invention.

Refer to FIG. 5 for another embodiment of the invention. The body 10 of the invention may be installed on the outside of the glass window 50 through various means. Besides using double-sided adhesive tape for the fastening section 12, magnets 30 or sucking discs 40 may also be used to directly mount the body 10 on the glass window 50.

In summary, the invention offers the following advantages:

1. The body 10 of the invention may be conveniently mounted on the exterior of a glass window 50 without complicated installation works, thus can save installation costs and time. Moreover, through the screen, outdoor temperature may be displayed in a humanely fashion (patterns), such as a sweater or overcoat to indicate very cold temperature, a long sleeve shirt to indicate warm temperature, and a short sleeve shirt to indicate hot temperature.
2. The temperature and humidity sensors and measuring circuit and screen may be integrated in one set. The power supply consisting of batteries may also be housed in the body. The whole apparatus may be made compact and portable, and may be installed without wiring.
3. The cover plate on the rear side of the body may guard the apparatus from being affected by sun radiation heat so that the temperature and humidity sensors can accurately measure outdoor air temperature and humidity.
4. The invention does not require a main device and a secondary device, and also does not need wiring during installation. The window also does not have to open for a slit, thus does not cause leakage of air conditioning or energy waste.

What is claimed is:

1. An apparatus for measuring outdoor temperature and humidity comprising:

a body including a temperature and humidity measuring circuit, a microprocessor circuit, a flat screen located on one side thereof, and a fastening section located on a periphery of said, one side for directly mounting the body on a glass window from outdoors to allow users to directly see the screen indoors to know outdoor temperature and humidity;

wherein the body further has a rear side adjacent said flat screen and pivotally engaging with an openable cover plate for serving as a sun shade to prevent the apparatus from being affected by sun radiation heat, the cover plate further having a temperature sensor and a humidity sensor located thereon, the rear side having two apertures formed at locations corresponding to the temperature sensor and the humidity sensor for housing the temperature sensor and the humidity sensor.

2. The apparatus for measuring outdoor temperature and humidity of claim 1, wherein the fastening section selectively consists of magnets or sucking discs for mounting the body on the exterior of the glass window.

\* \* \* \* \*